(12) United States Patent
Neuhaus et al.

(10) Patent No.: US 11,534,714 B2
(45) Date of Patent: Dec. 27, 2022

(54) GLYCOL DRYING SYSTEM AND METHOD FOR GLYCOL DRYING

(71) Applicant: RWE GAS STORAGE WEST GMBH, Essen (DE)

(72) Inventors: Guido Neuhaus, Duelmen (DE); Burkhard Lenth, Castrop-Rauxel (DE)

(73) Assignee: RWE GAS STORAGE WEST GMBH, Essen (DE)

( * ) Notice: Subject to any disclaimer, the term of this patent is extended or adjusted under 35 U.S.C. 154(b) by 220 days.

(21) Appl. No.: 16/756,245

(22) PCT Filed: Oct. 10, 2018

(86) PCT No.: PCT/EP2018/077549
§ 371 (c)(1),
(2) Date: Apr. 15, 2020

(87) PCT Pub. No.: WO2019/076694
PCT Pub. Date: Apr. 25, 2019

(65) Prior Publication Data
US 2020/0254379 A1    Aug. 13, 2020

(30) Foreign Application Priority Data
Oct. 16, 2017   (DE) .................... 10 2017 124 002.0

(51) Int. Cl.
*B01D 3/14*    (2006.01)
*B01D 53/14*   (2006.01)
(Continued)

(52) U.S. Cl.
CPC ......... *B01D 53/1425* (2013.01); *B01D 3/145* (2013.01); *B01D 53/1493* (2013.01);
(Continued)

(58) Field of Classification Search
CPC .............. B01D 53/1425; B01D 53/263; B01D 53/1406; B01D 1/00; B01D 53/14;
(Continued)

(56) References Cited

U.S. PATENT DOCUMENTS

2004/0206242 A1   10/2004   Wijmans et al.
2005/0022665 A1   2/2005    Baudot et al.
(Continued)

FOREIGN PATENT DOCUMENTS

DE   19808291 A1   9/1999
DE   19963305 A1   7/2001
FR   2819426 A1    7/2002

*Primary Examiner* — Sharon Pregler
(74) *Attorney, Agent, or Firm* — The Webb Law Firm

(57) ABSTRACT

Described and represented is a glycol drying system with at least one wet glycol collection container and/or at least one glycol collection line to collect moist glycol, with at least one heating device to heat the moist glycol in the at least one wet glycol collection container and/or in the at least one glycol collection line and with a membrane separation system to separate the water from the heated, moist glycol. In order to reduce the operating costs, without having to accept disproportionate investment costs, it is provided that at least one flash gas vent is provided to remove flash gas driven out when the moist glycol is heated before separating the water in the membrane separation system and in that at least one combustion chamber is provided to combust the flash gas and to provide heat for the heating device.

23 Claims, 1 Drawing Sheet

(51) Int. Cl.
*B01D 53/18* (2006.01)
*B01D 53/26* (2006.01)
*C10L 3/10* (2006.01)

(52) U.S. Cl.
CPC ........... *B01D 53/18* (2013.01); *B01D 53/263* (2013.01); *C10L 3/106* (2013.01); *B01D 2252/2025* (2013.01); *C10L 2290/08* (2013.01); *C10L 2290/545* (2013.01)

(58) Field of Classification Search
CPC ....... B01D 53/1418; B01D 53/26; C07C 7/11; C07C 9/04
See application file for complete search history.

(56) References Cited

U.S. PATENT DOCUMENTS

| | | |
|---|---|---|
| 2007/0209512 A1 | 9/2007 | Seibert |
| 2015/0128802 A1 | 5/2015 | Moneyhun |

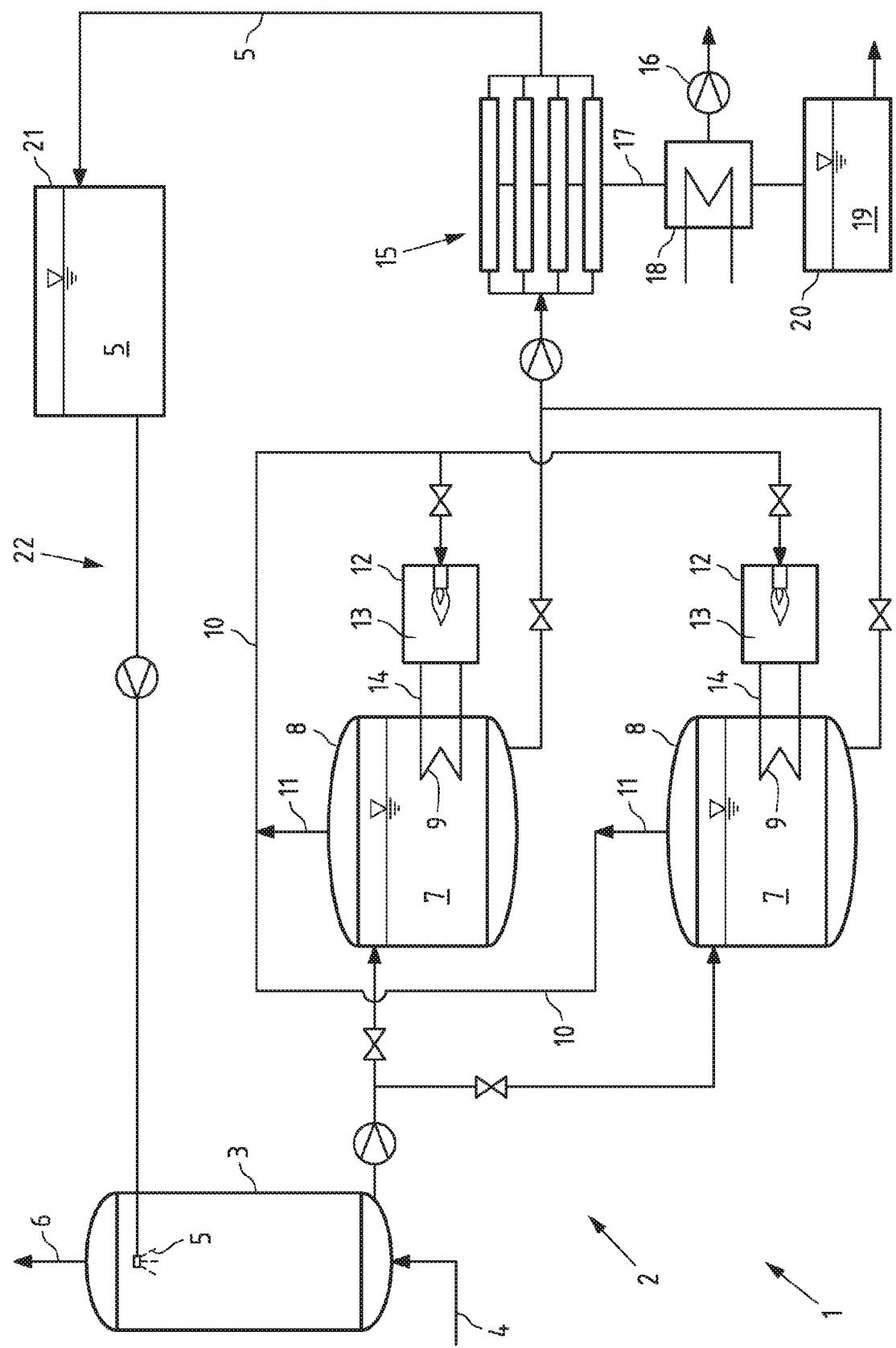

GLYCOL DRYING SYSTEM AND METHOD FOR GLYCOL DRYING

CROSS-REFERENCE TO RELATED APPLICATIONS

This application is the United States national phase of International Application No. PCT/EP2018/077549 filed Oct. 10, 2018, and claims priority to German Patent Application No. 10 2017 124 002.0 filed Oct. 16, 2017, the disclosures of which are hereby incorporated by reference in their entirety.

BACKGROUND OF THE INVENTION

Field of the Invention

The invention relates to a glycol drying system with at least one wet glycol collection container and/or at least one glycol collection line to collect moist glycol, with at least one heating device to heat the moist glycol in the at least one wet glycol collection container and/or in the at least one glycol collection line and with a membrane separation system to separate the water from the heated, moist glycol. The invention further relates to a gas drying system, in particular natural gas drying system with at least one absorber operated with glycol as the absorbent, in particular with at least one gas scrubber operated with glycol as the scrubbing medium, to absorb moisture, contained in the gas, in the glycol and with a glycol drying system to remove the moisture from the glycol. In addition, the invention relates to a method for drying glycol and a method for drying gas.

In order to dry gas, in particular natural gas, glycol is used. Thus, natural gas, for example when stored in underground stores, absorbs moisture in the form of water, which has to be removed again following removal of the natural gas from the underground store, for instance to avoid condensation in the transport lines. For drying, the natural gas is typically scrubbed with triethylene glycol (TEG) which absorbs the moisture supplied in the natural gas during gas scrubbing. Consequently, glycol functions as an absorbent to absorb water. During gas scrubbing, the triethylene glycol (TEG) usually absorbs between 0.5 m % and 2 m % water. In order that the glycol can be reused, the glycol is dried after the gas scrubbing.

DESCRIPTION OF RELATED ART

This takes place in many systems using distillation, whereby the glycol has to be heated to 190° C. to 205° C. This high temperature results in the thermal decomposition of the triethylene glycol (TEG). Therefore, it has to be replaced regularly, which increases the operating costs. The glycol is heated in a boiler which is heated with hot flue gases from the combustion of natural gas in a gas burner. The high flue gas temperatures require an increasingly more time-consuming and cost-intensive flue gas cleaning process for glycol drying systems from a permit-related and/or ecological view. In order to take this situation into account, glycol drying has been proposed using a membrane separation system which, however, results in increased operating costs.

Therefore, the object underlying the present invention is to design and further develop the glycol drying system, the gas drying system, the method for drying glycol and the method for drying gas in each case of the type mentioned at the outset and previously described in more detail such that the operating costs can be lowered without having to accept disproportionate investment costs.

SUMMARY OF THE INVENTION

This object is achieved with a glycol drying system in which at least one flash gas vent is provided to remove flash gas driven out when the moist glycol is heated before separating the water in the membrane separation system and in that at least one combustion chamber is provided to combust the flash gas and provide heat for the heating device.

The mentioned object is further achieved by a gas drying system in which a glycol drying system according to above is provided to remove the moisture from the moist glycol.

The previously mentioned object is further achieved by a method for drying glycol,
in the case of which moist glycol is heated,
in the case of which flash gas is driven out when the glycol is heated,
in the case of which the flash gas driven out is removed,
in the case of which the removed flash gas is combusted,
in the case of which the heat arising when the flash gas is combusted is used to heat moist glycol and to drive out flash gas and
in the case of which water from the moist glycol is separated in a membrane separation system after heating and removing flash gas.

The object mentioned at the outset is also achieved for drying gas, in particular natural gas,
in the case of which moisture from the gas is absorbed in at least one absorber, in particular gas scrubber, in glycol, in particular scrubbed with glycol,
in the case of which the moist glycol from the absorber is dried and
in the case of which the dried glycol, after separating the water from the moist glycol, is reused to absorb moisture from the gas in the at least one absorber.

According to the invention, it has therefore been acknowledged that combustible flash gas dissolved in the glycol can be used to heat the glycol in order to heat glycol before separating the water in the membrane separation system. Heating the glycol simplifies the separation of the water via a membrane in the membrane separation system since the glycol has a higher boiling point than the water. When glycol is mentioned here, triethylene glycol (TEG) is preferably meant by it. The amount of flash gas dissolved in the glycol is not enough to be able to distil the glycol to separate the water. However, the flash gas dissolved in the glycol is enough for moderately heating the glycol and simplifying the membrane separation.

However, heating the glycol simplifies not only the membrane separation to remove the water, but also drives flash gas out of the glycol in order to provide further fuel to further heat additional glycol. In order to be able to drive out enough flash gas from the glycol, the glycol is preferably heated at ambient pressure or maximally a slight overpressure or the flash gas is driven out at ambient pressure or maximally a slight overpressure. In this way, the provision and operation of pressure containers to handle moist glycol under significant overpressure is dispensable. Therefore, even available system technology can continue to be used to distil the glycol to a large extent if glycol distillation is supposed to be adapted according to the invention.

Since the flash gas is used to heat the glycol, a compression of the flash gas, for example to a pressure of between 3 bar and 80 bar, is also unnecessary.

The moist glycol is preferably collected in at least one wet glycol collection container and heated therein. The flash gas is driven out here and can be removed at the head of the wet glycol collection container. The essential principle of glycol drying remains unaffected by this.

There are also several constructive possibilities for the heat exchange between the combustion chamber to combust the flash gas and the subsequently flowing moist glycol of which the person skilled in the art can use at least one possibility. An indirect heat exchange is particularly preferred for instance via a heat carrier medium in order to avoid impurities of the glycol and therefore for example of a gas to be dried.

In addition, it is particularly preferred when the glycol drying is used to dry a gas in particular natural gas by means of glycol as the absorbent, in particular by means of a glycol scrubbing process. The glycol drying then serves to regenerate the glycol which as a result can be operated in the glycol circuit and reused multiple times.

The glycol drying system, the gas drying method and the gas drying method are described together in the present case without distinguishing in each case in detail between the corresponding systems and methods. However, it emerges for the person skilled in the art on the basis of the context which features are preferred in each case in regard to the systems and methods.

In the case of a first particularly preferred configuration of the glycol drying system, the at least one combustion chamber is assigned to a heat carrier system to heat the moist glycol by means of indirect heat exchange with a heat carrier medium. Consequently, via the heat released when the flash gas is combusted in the combustion chamber, a heat carrier medium, in particular a thermal oil or another liquid with a boiling point of preferably more than 100° C., can be heated which then provides the heat in a controlled manner to the moist glycol. Temperature peaks can for example be cushioned in that way and the heat can be buffered or stored to a certain extent. The heat carrier system can have heat transfer surfaces in thermal contact with the heat carrier medium for the transfer of the heat from the flue gas, formed when the flash gas is combusted, to the heat carrier medium. The heat transfer surfaces can be formed by pipes for the sake of simplicity which are flowed through by the heat carrier medium.

Alternatively or additionally, the at least one combustion chamber can be provided by the combustion chamber of a micro gas turbine. In order to use the heat contained in the exhaust gas of the micro gas turbine, the micro gas turbine can also be equipped with an exhaust gas heat exchanger. In this case, the exhaust gas heat exchanger can be formed and integrated into the entire system such that the heat removed from the exhaust gas in the exhaust gas heat exchanger is, if required, transferred via a heat carrier medium, in particular thermal oil, to the moist glycol.

Constructively and in regard to carrying out the method, it is particular simple when the flash gas vent is provided on the at least one wet glycol collection container. In order to save on the device effort for a wet glycol collection container, the flash gas vent can, however, for example also be provided on the at least one glycol collection line and namely alternatively or additionally. Irrespective of this, it may be expedient to provide two wet glycol collection containers with in each case one flash gas vent. As a result, a redundancy can be provided which can be used in particular to alternatively heat the moist glycol in the at least two wet glycol collection containers. While moist glycol depleted with flash gas is supplied from a wet glycol collection container to the membrane separation system, glycol can be collected in another wet glycol collection container and be heated to drive out the flash gas. If the flash gas has been removed, the glycol can be directed from this wet glycol collection container into the membrane separation system, while further glycol is now intermediately stored in the other wet glycol collection container. The glycol dried via the membrane separation system is preferably collected in at least one dry glycol collection container in order to guide the dried glycol back to the absorber.

The membrane separation system is preferably a pervaporation membrane system or vapour permeation membrane system. Both terms are often used synonymously. In such membrane separation methods, the permeate, here the water, is removed in vapour form. To this end, an underpressure is preferably generated on the permeate side. In order to condense the water vapour generated in the membrane separation system, a condenser to condense the vapour can be arranged downstream of the membrane system on the permeate side.

In the case of a first particularly preferred configuration of the gas drying system, a glycol return system is provided to reuse the dried glycol as absorbent in at least one absorber. The glycol can therefore be conveyed in a circuit which reduces the quantity of glycol required. It preferably concerns a closed glycol circuit between the absorber and the membrane separation system. The glycol can be at least partially replaced from time to time. Otherwise, the gas drying system can, however, be operated for a very long time with the same glycol owing to the sparing use of the glycol.

In the case of a first particularly preferred configuration of the glycol drying method, the heat arising when the flash gas is combusted is used to heat a heat carrier medium, in particular a thermal oil and/or to drive a micro gas turbine. The heated heat carrier medium can then provide its heat to the moist glycol. If the flash gas is used to operate a micro gas turbine, not only can the released heat be used, but the shaft of the micro gas turbine can also be rotated, for instance in order to drive a generator or another device. The heat of the micro gas turbine, in particular of the exhaust gas from the micro gas turbine, can for example be used by an exhaust gas heat exchanger, for instance to heat a heat carrier medium. Consequently, it is particularly preferred when the heat carrier medium, in particular the thermal oil, and/or the exhaust gas heat of the micro gas turbine is used to indirectly heat the moist glycol.

It lends itself for separating the moisture from the moist glycol and driving out the dissolved flash gas from the moist glycol to heat the moist glycol, with the maximum temperature of the heated moist glycol being less than 300° C., preferably less than 200° C., in particular less than 150° C. for a particularly efficient operation of the glycol drying system. Lower temperatures of the moist glycol are in this respect preferred as they are sufficient for an effective membrane separation and also the quantity of flash gas driven out is sufficient in order to heat the moist glycol to the desired target temperature without further heat application. Although, the temperature of the moist glycol should also not be too low such that temperatures of at least 100° C. will essentially be preferred. In this case, 110° C. to 130° C. has proven to be the particularly preferred temperature range for the moist glycol.

Alternatively or additionally, it lends itself when the flash gas is driven out of the moist glycol at an absolute pressure of less than 5 bar, preferably less than 3 bar, in particular less than 2 bar. A lower pressure reduces the system-related effort just like the operation of the system. In addition, the outgassing of the flash gas is favoured. Nevertheless, a higher pressure is expedient for the separation of water in the membrane separation system. Consequently, the pressure of the moist glycol can be raised after removing the flash gas and before the membrane filtration.

It lends itself for simply and reliably heating the moist glycol and outgassing the flash gas when the moist glycol is collected and/or heated alternately and successively in at least two different wet glycol collection containers. Thus, for example moist and degassed, i.e. depleted with flash gas, glycol can be held in one wet glycol collection container in order to supply it to the membrane separation system, while moist glycol is intermediately stored, degassed and/or heated in at least one other wet glycol collection container. Consequently, the flash gas can be driven out alternately and successively from the moist glycol in at least two different wet glycol collection containers and/or removed from at least two wet glycol collection containers.

The water can be particularly effectively separated from the moist glycol by pervaporation or vapour permeation. This applies in particular because the glycol typically has only a low moisture content. Furthermore, it is expedient and namely in particular in relation to the pervaporation or vapour permeation of the moist glycol when the separated water is subsequently condensed. To this end, at least one condenser of a type known per se can be used.

In the case of a first particularly preferred configuration of the gas drying method, the glycol is guided in a circuit between the absorber to absorb water from the gas to be dried, on the one hand, and the membrane separation system to separate the absorbed water, on the other hand. This glycol circuit is preferably closed in relation to the glycol in order to keep the need for glycol low, although the glycol can be at least partially replaced from time to time.

BRIEF DESCRIPTION OF THE DRAWINGS

The invention is explained in more detail below on the basis of a single FIGURE representing merely one exemplary embodiment.

DESCRIPTION OF THE INVENTION

In the single FIGURE, a gas drying system 1 comprising a glycol drying system 2 is represented. A moist gas, in particular natural gas, which has for example been removed from an underground store, can be supplied via a crude gas line 4 to an absorber 3, which is formed in the present case as a scrubber. The gas is brought into close contact with glycol 5, in particular triethylene glycol (TEG) in the absorber 3, whereby the moisture of the gas is taken up by the glycol 5, consequently absorbed. In the absorber 3 represented and in this respect preferred, glycol 5 is sprayed in a finely distributed manner into the gas flowing through the absorber 3. The dried gas leaves the represented absorber at its head via a clean gas line 6.

An absorber circuit can be assigned to the absorber, which is not represented. Glycol is removed from the sump of the absorber 3 via a pump of the absorber circuit and sprayed again via nozzles in the absorber 3. A part of the glycol can be removed from this absorber circuit or from the sump as moist glycol 7 in order to dry the moist glycol 7. However, a corresponding absorber circuit can also be dispensed with and the moist glycol 7 can be supplied directly from the sump of the absorber 3 to the glycol drying system 2 without being sprayed in the absorber 3 again.

The glycol drying system 2 represented and in this respect preferred has two wet glycol collection containers 8 in which the moist glycol 7 is alternately collected from the absorber 3. While the moist glycol 7 is intermediately stored in a wet glycol collection container 8, the moist glycol 7 is heated via a heat exchanger 9 and namely in this case for instance to a temperature of 120° C. The pressure in the wet glycol collection container 8 corresponds here, if necessary, approximately to the ambient pressure and in the present case is less than 1.5 bar absolute. In this case, flash gas 10 escapes from the moist glycol 7, which in the present case is natural gas dissolved in the moist glycol 7 in the absorber 3. The flash gas 10 is removed at the head of the corresponding wet glycol collection container 8 via a flash gas vent 11 and supplied to a heating device 12 in the form of a thermal oil system. The flash gas 10 is combusted in a combustion chamber 13 in the heating device 12 formed as a thermal oil system and heats a thermal oil 14 here which then provides its heat via the heat exchanger 9 in the wet glycol collection container 8 to the moist glycol 7. If the wet glycol collection container 8 is filled and the moist glycol 7, on the one hand, is heated and, on the other hand, degassed, further moist glycol 7 is directed from the absorber 3 into the other wet glycol collection container 8 in which the moist glycol 7 is heated and degassed as described. The flash gas 10 resulting here is also removed at the head of the wet glycol collection container 8 via a flash gas vent 11 and supplied to a heating device 12 to heat a wet glycol collection container 8. In the present case, a heating device 12 in the form of a thermal oil system is assigned to each wet glycol collection container 8 in order to generate a corresponding redundancy. Essentially however, a single heating device 12 could also be enough.

The moist glycol 7 is supplied to a membrane separation system 15 from the wet glycol collection container 8 in each case filled with heated and degassed glycol 7, in which an underpressure is pulled using the vacuum pump 16 on the permeate side in the glycol drying system 2 represented and in this respect preferred. The moisture of the moist glycol 7 passes the membrane and is discharged in vapour form on the permeate side after passing through the membrane, preferably organic membrane, for instance based on cellulose. Therefore, the method is also designated as pervaporation or also vapour permeation. The water vapour 17 accruing in the membrane separation system 15 is condensed in a condenser 18 arranged downstream into at least substantially pure water 19 which is intermediately stored in a storage container 20 and which can accordingly be used in other processes.

The retentate from the membrane separation system 15 accrues as dried glycol 5, and a residual moisture content can still be present in the dried glycol 5. The dried glycol 5 is intermediately stored in a dry glycol collection container 21 and is supplied from there again to the absorber 3 to scrub moisture out of the gas passing the absorber 3. The glycol 5, 7 is therefore guided in the gas drying system in a closed glycol circuit 22 between the absorber 3, the wet glycol collection containers 8 and the membrane separation system 15 and, if required, from the dry glycol collection container 21, with an exchange of glycol 5, 7 being possible from time to time, if required.

LIST OF REFERENCE NUMERALS 1 gas drying system
2 glycol drying system 3 absorber
4 crude gas line
5 dried glycol
6 clean gas line
7 moist glycol
8 wet glycol collection container
9 heat exchanger
10 flash gas
11 flash gas vent
12 heating device
13 combustion chamber
14 thermal oil
15 membrane separation system
16 vacuum pump
17 water vapour
18 condenser
19 water
20 storage container
21 dry glycol collection container
22 glycol circuit

The invention claimed is:

1. A glycol drying system comprising:
at least one wet glycol collection container and/or at least one glycol collection line to collect moist glycol;
at least one heating device to heat the moist glycol in the at least one wet glycol collection container and/or in the at least one glycol collection line;
a membrane separation system configured to separate the water from the heated, moist glycol;
at least one flash gas vent configured to remove flash gas driven out, when the moist glycol is heated before separating the water in the membrane separation system; and
at least one combustion chamber configured to combust the flash gas and provide heat for the heating device, wherein the combustion chamber is provided in a micro gas turbine with an exhaust gas heat exchanger and the exhaust gas heat exchanger is configured to transfer the heat of the exhaust gas to the moist glycol.

2. The glycol drying system according to claim 1,
wherein the combustion chamber is assigned to a heat carrier system to heat the moist glycol by indirect heat exchange with a heat carrier medium, and
wherein the heat carrier system has heat transfer surfaces configured to heat the heat carrier medium through the heat released in the combustion chamber.

3. The glycol drying system according to claim 1,
wherein the flash gas vent is provided on the at least one wet glycol collection container and/or the at least one glycol collection line and/or
wherein the system further comprises two wet glycol collection containers, each provided with one of the at least one flash gas vent.

4. The glycol drying system according to claim 1,
wherein the membrane separation system is a pervaporation membrane system or vapour permeation membrane system.

5. A gas drying system, comprising:
at least one absorber operated with glycol as the absorbent configured to absorb moisture, contained in the gas, in the glycol, and
the glycol drying system according to claim 1 configured to remove the moisture from the moist glycol.

6. The gas drying system according to claim 5, further comprising:
a glycol return system configured to reuse the dried glycol as the absorbent in the at least one absorber.

7. A method for drying glycol, comprising
heating moist glycol,
driving out flash gas when the glycol is heated,
removing the flash gas driven out,
combusting the removed flash gas,
using the heat resulting when the flash gas is combusted to heat moist glycol and to drive out flash gas,
separating water from the moist glycol in a membrane separation system after heating and removing flash gas,
using the heat resulting when the flash gas is combusted to drive a micro gas turbine, and
using the exhaust gas heat of the micro gas turbine indirectly heat the moist glycol.

8. The method according to claim 7, further comprising:
using the heat resulting when the flash gas is combusted to heat a heat carrier medium, and
using the heat carrier medium to indirectly heat the moist glycol.

9. The method according to claim 7, further comprising:
heating the moist glycol to a temperature of less than 300° C., and/or
driving out the flash gas from the moist glycol at an absolute pressure of less than 5 bar.

10. The method according to claim 7, further comprising:
collecting and/or heating the moist glycol alternately and successively in at least two wet glycol collection containers, and/or
driving out the flash gas alternately and successively from the moist glycol in the at least two wet glycol collection containers and/or removing the flash gas from the at least two wet glycol collection containers.

11. The method according to claim 7, further comprising:
separating the water from the moist glycol by pervaporation or vapour permeation.

12. A method for drying gas comprising:
absorbing moisture from the gas, in at least one absorber, in glycol,
drying the moist glycol from the absorber with a method according to claim 7, and
reusing the dried glycol, after separating the water from the moist glycol, to absorb moisture from the gas in the at least one absorber.

13. The method according to claim 12, further comprising:
guiding the glycol in a glycol circuit between the absorber to absorb water through the glycol and the membrane separation system to separate the absorbed water from the moist glycol.

14. The glycol drying system according to claim 3, wherein the two wet glycol collection containers, each provided with one of the at least one flash gas vent, are configured to mutually heat the wet glycol.

15. The glycol drying system according to claim 4, wherein the system further comprises a condenser configured to condense the water separated in the membrane separation system.

16. The gas drying system according to claim 5, wherein the system is a natural gas drying system.

17. The gas drying system according to claim 5, wherein the at least one absorber operated with glycol as the absorbent is at least one gas scrubber operated with glycol as the scrubbing medium.

18. The gas drying system according to claim 6, further comprising:
a closed glycol circuit provided between the absorber and the membrane separation system.

19. The method according to claim 9, further comprising:
heating the moist glycol to a temperature of less than 200° C.

20. The method according to claim 9, further comprising:
driving out the flash gas from the moist glycol at an absolute pressure of less than 3 bar.

21. The method according to claim 11, further comprising:
subsequently condensing the separated water.

22. The method for drying gas according to claim 12, wherein the gas is a natural gas.

23. The method for drying gas according to claim 12, wherein absorbing moisture from the gas, in at least one absorber, in glycol comprises scrubbing the gas with glycol in a gas scrubber.

* * * * *

UNITED STATES PATENT AND TRADEMARK OFFICE
CERTIFICATE OF CORRECTION

PATENT NO. : 11,534,714 B2
APPLICATION NO. : 16/756245
DATED : December 27, 2022
INVENTOR(S) : Guido Neuhaus et al.

Page 1 of 1

It is certified that error appears in the above-identified patent and that said Letters Patent is hereby corrected as shown below:

In the Claims

Column 8, Line 1, Claim 7, delete "comprising" and insert -- comprising: --

Column 8, Line 13, Claim 7, after "turbine" insert -- to --

Column 8, Line 36, Claim 12, delete "gas" and insert -- gas, --

Signed and Sealed this
Twenty-eighth Day of February, 2023

Katherine Kelly Vidal
*Director of the United States Patent and Trademark Office*